United States Patent Office 2,907,221
Patented Oct. 6, 1959

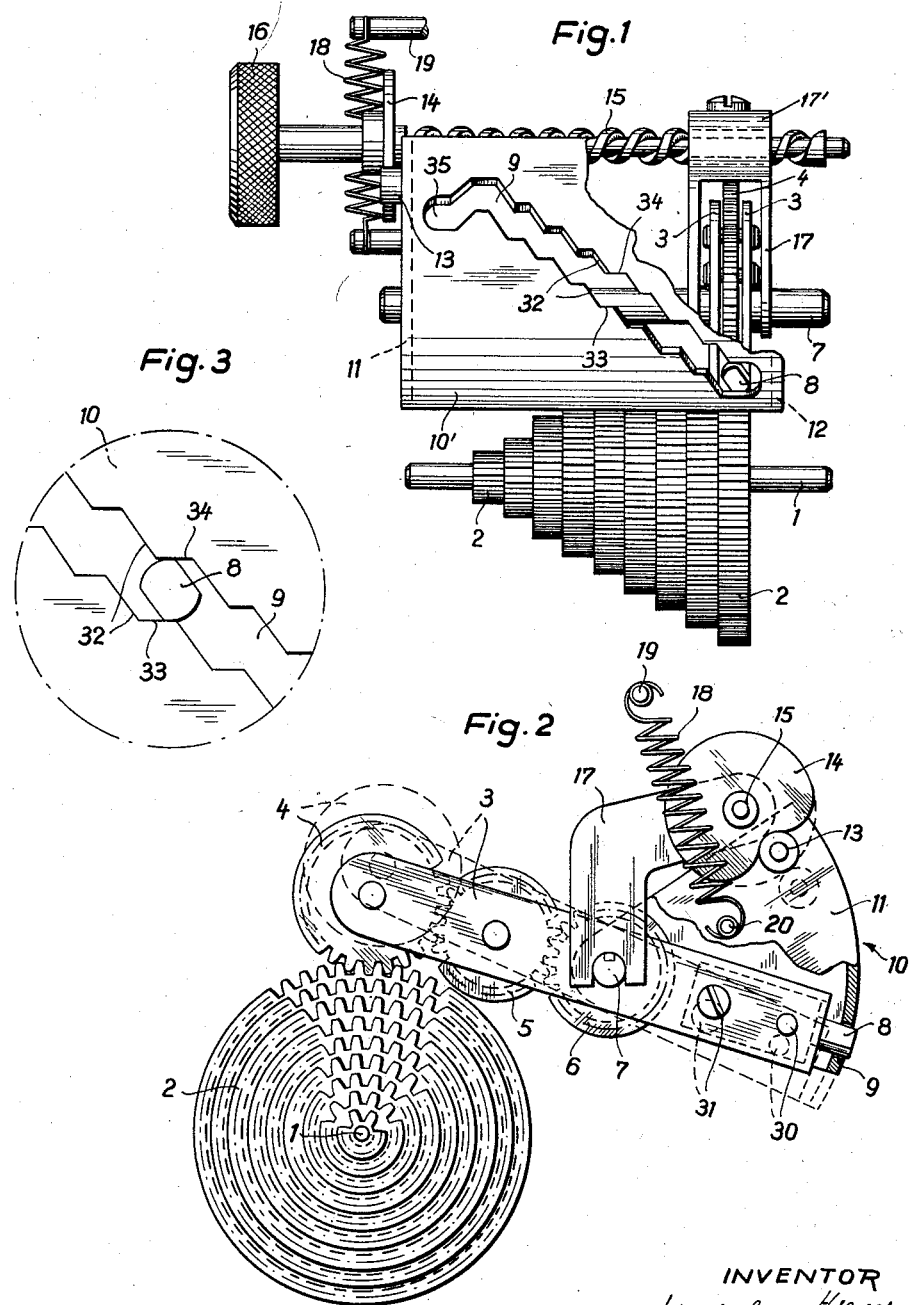

2,907,221

ADJUSTABLE TRANSMISSIONS

Wilhelm Haupt, Villingen, Black Forest, Germany, assignor to Firma Kienzle Apparate G.m.b.H., Villingen, Black Forest, Germany Application August 21, 1958, Serial No. 756,335

Claims priority, application Germany August 22, 1957

9 Claims. (Cl. 74—352)

The present invention relates to an adjustable transmission.

The transmission of the present invention is adapted to be used, for example, with gasoline pumps or the like where the price per unit of volume of the liquid which is dispensed varies so as to require the transmission to be adjusted according to the particular price per unit of volume of the dispensed liquid.

Conventional adjustable transmissions of this type have several disadvantages. For example, they include extremely strong springs the force of which must be opposed manually by the operator when adjusting the transmission. Furthermore, such transmissions generally include a stepped gear assembly and a gear train cooperating therewith, and in the conventional transmissions it is required, even when adjusting the gear train from one gear of the stepped gear assembly to the next gear thereof, to displace the gear train with respect to the stepped gear assembly by a radial distance at least equal to the radius of the largest gear of the stepped gear assembly so that the parts must be moved by the operator through an extremely large distance each time an adjustment is made. Moreover, conventional transmissions of the above type require cams of exceedingly complex configuration.

One of the objects of the present invention is to provide an adjustable transmission of the above type which requires the operator to exert, when adjusting the transmission, a force far less than that required by a conventional transmission of the above type.

Another object of the present invention is to provide an adjustable transmission wherein a gear train can be shifted from one to the next gear of a stepped gear assembly by being radially displaced from the latter only through a distance slightly greater than the difference between the pair of radii of the gears between which the gear train is shifted.

A further object of the present invention is to provide an adjustable transmission which includes cams of far simpler construction than those of conventional transmissions.

An additional object of the present invention is to provide an adjustable transmission capable of accomplishing the above objects and at the same time composed of simple ruggedly constructed elements which form a compact unit which will operate smoothly, quietly and reliably over a long period of time.

With the above objects in view the invention includes in an adjustable transmisson of the above type a rotary stepped gear assembly and a gear train which is adapted to cooperate therewith. A positioning means having a construction according to the present invention cooperates with this gear train for axially shifting the latter from one to the next gear of the stepped gear assembly while radially displacing the gear train with respect to the stepped gear assembly through a distance only slightly greater than the difference between the radii of the adjoining gears of the assembly between which the gear train is shifted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view of an adjustable transmission according to the present invention, part of a bail of the structure of Fig. 1 being broken away to clearly illustrate the parts behind this bail;

Fig. 2 is a view of the structure of Fig. 1 as seen from the left side of Fig. 1 with an operating knob of Fig. 1 removed and with part of an end wall of the bail broken away to illustrate the structure more clearly; and Fig. 3 is a fragmentary illustration of the cooperation between a stepped camming cutout and a cam follower of the transmission.

The structure illustrated in Figs. 1 and 2 is adapted to be used, for example, with a gasoline pump or other liquid dispenser where the volume of liquid dispensed is measured by a suitable measuring device such as a flow meter. The drive shaft of such a meter is connected with the shaft 1 shown in Figs. 1 and 2 so that this shaft turns through a number of revolutions which is proportional to the volume of liquid dispensed. The shaft 1 fixedly carries for rotation therewith a stepped gear assembly 2 made up of a series of co-axial gears which are of progressively larger diameters from left to right, as viewed in Fig. 1. The stepped gear assembly 2 forms the input of the transmission of the invention. The output of the transmission of the invention is the shaft 7 which is parallel to the axis of rotation of the rotary stepped gear assembly 2. This shaft 7 drives through an unillustrated motion transmitting structure a totalizer which indicates the total price for the dispensed liquid.

A gear train cooperates with the stepped gear assembly 2, on the one hand, and with the output shaft 7, on the other hand, for transmitting the rotary movement of the stepped gear assembly to the output shaft. This gear train includes a first gear 4 which meshes with a selected gear of the stepped gear assembly 2. This first gear 4 of the gear train meshes with an intermediate gear 5 which in turn meshes with the last gear 6 of the gear train. This last gear 6 is slidably keyed to the shaft 7 so as to be axially shiftable therealong while at the same time rotating the shaft 7.

The gear train 4–6 is supported by a lever 3 which is itself supported intermediate its ends for turning movement by the shaft 7. Thus, the lever 3 includes a pair of elongated plates which are coextensive and which are respectively formed with aligned openings through which the shaft 7 extends so that the lever is supported for free turning movement with respect to the shaft 7. It should be noted that the gear 6 is provided with a key located in a keyway extending axially along the shaft 7 so that there is no key projecting beyond the exterior surface of the shaft 7 to interfere with the turning movement of the lever 3. The gears 4 and 5 of the gear train are respectively carried by shafts each of which has its ends located in a pair of aligned openings of the pair of plates which form the lever 3. It will be noted particularly from Fig. 2 that the lever 3 has a right end portion, as viewed in Fig. 2, distant from the gear 4.

A bail 10 is turnably carried by the shaft 7, and this bail has a wall 10′ spaced from and extending parallel to the shaft 7 and located adjacent to the right end portion of the lever 3, as viewed in Fig. 2, this wall 10′ of the bail 10 forming part of a cylinder whose axis coincides with that of the shaft 7. The bail 10 has a pair of sector-shaped end walls 11 and 12 respectively formed with aligned openings through which the shaft 7 passes, and any suitable collars are fixed to the shaft 7 and engage the end walls 11 and 12 to prevent axial movement of the bail 10 with respect to the shaft 7 while at the same time providing free turning movement of the shaft 7 with respect to the bail and of the bail with respect to the shaft 7.

The wall 10' of the bail 10 is formed with a stepped camming cutout 9 which in the illustrated example takes the form of a slot in the wall 10'. The stepped configuration of the camming cutout 9 is particularly evident from Figs. 1 and 3. The camming cutout 9 is composed of a plurality of successive stepped cutout portions each of which has a pair of opposed parallel edges 33 and 34 which are parallel to the shaft 7 and a second pair of opposed parallel edges 32 extending respectively at an obtuse angle from the edges 33 and 34 to the edges 33 and 34 of the next stepped cutout portion. As is evident from Fig. 1, the steps of the camming cutout 9 respectively correspond with the gears of the stepped gear assembly 2.

A cam follower 8 cooperates with the camming cutout 9 and is fixed to the right end portion of the lever 3 as viewed in Fig. 2. The cam follower 8 includes not only the portion which extends through the slot 9 but also a block fixed to this portion and located between the pair of plates which form the lever 3, this block being pivotally supported between these plates by a pivot pin 30, extending through aligned openings of the plates which form the lever 3 as well as through an opening of the block of the cam follower. A screw 31 passes through an opening in one of the plates of lever 3 and threadedly cooperates with a threaded opening in the other plate of the lever 3 to pull these plates together for tightly clamping the block of the cam follower between these plates, and the opening of the block through which screw 31 passes is in the form of a short arc whose center is in the axis of the pin 30 and whose length is greater than the diameter of the screw 31 so that a limited angular adjustment of the cam follower with respect to the lever 3 is provided.

As is particularly evident from Fig. 3 the cam follower 8 has a pair of opposed convex faces forming part of a cylinder and respectively engaging the opposed parallel edges 33 and 34 of a camming cutout portion when the gear 4 meshes with one of the gears of the stepped gear assembly 2. Also, the follower 8 has a pair of opposed parallel flat faces which are respectively parallel to the opposed parallel inclined edges 32 of each stepped camming cutout portion. As will be apparent from the description below, during movement of the gear train 4–6 from one to the next gear of the assembly 2, a force is applied to the cam follower 8 urging the latter in a direction parallel to the axis of the shaft 7. The obtuse angle between the edges 32 and the edges 33 and 34, respectively, is located beyond the angle of friction, which is to say that the edges 32 cooperate with the parallel faces of the follower 8 to permit the latter to slide along the edges 32 from one to the next stepped cutout portion in response to a force applied to the follower 8 and acting only in a direction parallel to the shaft 7. If the edges 32 were close to a right angle with respect to the edges 33 and 34, this would not be possible. Therefore, by locating the edges 32 at an angle with respect to the edges 33 and 34 which is beyond the angle of friction, binding and jamming of the adjustable transmission during adjustment of the same is reliably prevented.

As may be seen from Fig. 2, during cooperation of the gear 4 with one of the gears of the assembly 2 there is a tendency for the gear 4 to move out of mesh with the gear with which it cooperates so as to tend to turn the lever 3 in a clockwise direction, as viewed in Fig. 2, and the cam follower 8 cooperates with the lower edge 33 to prevent such turning of the lever 3 and to guarantee that the gear 4 remains in mesh with the selected gear of the stepped gear assembly 2. The upper edge 34 of each stepped cutout portion of the camming cutout cooperates with the follower 8 to regulate the extent to which the gear 4 meshes with one of the gears of the stepped gear assembly so as to prevent possible binding between the meshing gears. Of course, the adjustment of the follower 8 with respect to the lever 3 as described above serves to regulate the extent to which the gear 4 meshes with the gears of the stepped gear assembly 2.

The left end 35 (Fig. 1) of the camming cutout 9 serves to locate the gear train 4–6 in a zero position where the adjusted value is zero. When the cam follower 8 is in the end 35 of the camming cutout the gear 4 is in mesh with an unillustrated stationary gear so as to prevent rotation of the shaft 7.

A second cam follower 13 is fixedly carried by the end wall 11 of bail 10 and may be in the form of a roller. This cam follower 13 cooperates with a second cam 14 which is fixedly carried by a screw 15 which extends parallel to the shafts 1 and 7. The shafts 1 and 7 as well as the screw 15 are supported for rotation about their axes, respectively, by unillustrated stationary bearings which may be carried by the walls of any suitable housing for the transmission. It will be noted from Fig. 2 that the cam 14 is of an exceedingly simple configuration and is provided along its periphery with a single peripheral indentation which receives the follower 13. A knob 16 accessible to the operator is fixedly carried by the screw 15 so that the latter is manually turnable, and thus the operator controls the rotary movement of the cam 14. The parts 14–16 may be turned in one direction or the other depending upon the desired adjustment of the transmission of the invention.

A nut 17' threadedly cooperates with the screw 15 to be shifted to the right or left as viewed in Fig. 1, depending upon the direction of rotary movement of the screw 15, and this nut 17' is integral with a shifting means 17 having a pair of downwardly directed arms between which the gear train 4–6 and lever 3 are located. A pair of spacer rings are respectively located between the plates of the lever and the arms of the shifting means 17, so as to maintain the lever 3 spaced from the arms of the shifting means 17 and so as to transmit axial movement of the shifting means 17 in one direction or the other to the lever 3 and the gear train carried thereby. It will be noted from Fig. 2 that the arms of the shifting means 17 terminate at their bottom ends respectively in substantially U-shaped notches in which the shaft 7 is located so that the shifting means 17 and the nut 17' fixed thereto cannot turn and can only move axially in response to rotary movement of the screw 15.

A spring 18 is connected at one end to a stationary post 19 which is fixedly carried by any suitable stationary bracket or the like (not shown) and the other end of the spring 18 is connected to a post 20 which is fixed to the end wall 11 of the bail 10 so that the spring 18 urges the bail 10 in a counter-clockwise direction about the shaft 7, as viewed in Fig. 2, and thus maintains the follower 13 in engagement with the cam 14. The radial distance of the single indentation of the cam 14 from the screw 15 is such that when the follower 13 is in this indentation, the gear 4 meshes with a gear of the assembly 2 which is determined by the particular cutout portion of the cutout 9 in which the follower 8 is located. The force exerted by the spring 18 is greater than the largest possible pressure between the teeth of the gear 4 and any one of the gears of the assembly 2, so that the spring 18 overcomes any tendency of the gear 4 to move away from the assembly 2.

The above described structure operates as follows:

The flow meter movement is transmitted by the shaft 1 to the stepped gear assembly 2. The rotary movement of the latter is transmitted through the gear train 4–6 to the output shaft 7 which drives a totalizer. When it is desired to change the price per unit of volume of the dispensed liquid, it is necessary to change the transmission ratio between the shafts 1 and 7 to correspond to the new price and for this purpose the operator turns the knob 16 and irrespective of its direction of rotation the cam 14 will cooperate with the follower 13 to turn the bail 10 against the force of the spring 18 in a clockwise direction around the shaft 7, as viewed in Fig. 2, and the cam 14 cooperates with follower 13 to turn the bail 10 through an angular distance only slightly greater than that necessary to move the gear 4 out of mesh with the assembly 2, as is evident from the dotted lines in Fig. 2. Simultaneously with the turning of the screw 15 and the cam 14, the nut 17' is axially moved so that the shifting means 17 shifts the lever 3 and the gear train 4–6 toward the next gear of the assembly 2, and the particular stepped cutout portion of the cutout 9 with which the cam follower 8 cooperates at this particular time causes the lever 3 to be turned with respect to the shaft 7 to an angular position which will locate the gear 4 close to the teeth of the next gear of the assembly 2. Thus, the structure of the invention includes a positioning means made up on the one hand of parts 15, 17', 17 for axially positioning the gear 4 of the gear train in axial alignment with the next gear of the assembly 2 after one rotation of the screw 15, and on the other hand this positioning means includes a cam 9 together with the lever 3 and follower 8 which act to position the gear 4 radially with respect to the next gear of the assembly 2 in such a position that the gear 4 is close to this next gear and will move into mesh with the latter during the final portion of the single revolution of the cam 14 when the follower 13 again enters into the single indentation of the cam 14. It is apparent, therefore, that with the transmission of the invention the gear train is displaced radially with respect to the stepped gear assembly by a distance only slightly greater than the difference between the radii of the gears between which the gear train is shifted, and thus even though the spring 18 may be relatively strong the operator need only stretch this spring 18 to a relatively small extent in order to provide the necessary adjustment. It will be noted that irrespective of which of the gears of the assembly 2 happens to mesh with the gear 4, the bail 10 is always in the same angular position.

It will be understood that each of the elements described above, or two or more together, may also find a useful application in other types of transmissions differing from the types described above.

While the invention has been illustrated and described as embodied in adjustable transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An adjustable transmission comprising, in combination, a rotary stepped gear assembly forming the input of the transmission; an output shaft parallel to the axis of rotation of said stepped gear assembly and spaced from the latter; a gear train cooperating with said assembly and said shaft for transmitting rotary movement of said assembly to said shaft; and positioning means cooperating with said gear train for axially shifting the latter from one to the next gear of said stepped gear assembly while displacing said gear train radially with respect to said assembly by a distance only slightly greater than the difference between the radii of said one gear and next gear of said assembly, said positioning means including a lever supporting said gear train and turnable about an axis parallel to the axis of rotation of said stepped gear assembly, a first cam of a stepped configuration corresponding to the differences between the radii of the gears of said stepped gear assembly cooperating with said lever for regulating the inclination thereof so as to place a gear of said gear train in mesh with a selected gear of said stepped gear assembly according to the axial position of said lever with respect to said first cam, and a second cam cooperating with said first cam for moving the latter only through a distance sufficient to move the gear of said gear train which meshes with a gear of said assembly out of mesh with the latter.

2. An adjustable transmission comprising, in combination, a rotary stepped gear assembly forming the input of the transmission; an output shaft parallel to the axis of rotation of said stepped gear assembly and spaced from the latter; a gear train cooperating with said assembly and said shaft for transmitting rotary movement of said assembly to said shaft; and positioning means cooperating with said gear train for axially shifting the latter from one to the next gear of said stepped gear assembly while displacing said gear train radially with respect to said assembly by a distance only slightly greater than the difference between the radii of said one gear and next gear of said assembly, said positioning means including a lever supporting said gear train and turnable about an axis parallel to the axis of rotation of said stepped gear assembly and a stepped cam cooperating with said lever for determining the inclination thereof, said stepped cam being composed of a plurality of camming steps each of which has an axial edge parallel to said axis of said assembly and an inclined edge extending at an obtuse angle from said axial edge thereof.

3. An adjustable transmission comprising, in combination, a rotary stepped gear assembly forming the input of the transmission; an output shaft parallel to the axis of rotation of said stepped gear assembly and spaced from the latter; a gear train cooperating with said assembly and said shaft for transmitting rotary movement of said assembly to said shaft; positioning means cooperating with said gear train for axially shifting the latter from one to the next gear of said stepped gear assembly while displacing said gear train radially with respect to said assembly by a distance only slightly greater than the difference between the radii of said one gear and next gear of said assembly, said positioning means including a lever supporting said gear train and turnable about an axis parallel to the axis of rotation of said stepped gear assembly and a stepped cam cooperating with said lever for determining the inclination thereof; and adjusting means cooperating with said lever for adjusting the inclination thereof with respect to said cam, for regulating the extent to which an end gear of said gear train meshes with a gear of said assembly.

4. An adjustable transmission comprising, in combination, a rotary stepped gear assembly rotatable about its own axis and forming the input of the transmission; an output shaft parallel to said axis; a gear train cooperating with said assembly and shaft for transmitting rotation of said assembly to said shaft, said gear train including a first gear for meshing with one of the gears of said assembly and a last gear slidably keyed to said shaft for axial movement therealong and for rotating the same; a lever turnably supported intermediate its ends by said shaft and supporting said gear train, said lever having an end portion distant from said first gear of said gear train; a bail turnably carried by said shaft and having a wall spaced from and parallel to said shaft and located adjacent said portion of said lever, said wall being formed with a stepped camming cutout including a plurality of stepped cutout portions respectively corresponding to the gears of said gear assembly and aligned respectively therewith, each of said stepped cutout portions having a first pair of opposed parallel edges extending parallel to said axis and a second pair of opposed parallel edges extending at an obtuse angle from said first pair of edges, respectively, to the first pair of parallel edges of the next stepped cutout portion; a cam follower located in said cutout for movement therealong in response to a force urging said follower in a direction parallel to said axis, said follower being fixed to said end portion of said lever; a screw spaced from and parallel to said shaft; a nut threadedly cooperating with said screw; shifting means fixed to said nut for axial movement therewith during turning of said screw and cooperating with said lever for shifting the latter together with said gear train axially along said shaft, said cam follower cooperating with said camming cutout for turning said lever about the axis of said shaft to positions where said first gear meshes successively with the gears of said assembly during axial movement of said gear train along said shaft; a second cam follower carried by said bail; a second cam carried by said screw for rotary movement therewith and cooperating with said second cam follower for turning said bail around the axis of said shaft only to an extent sufficient to move said first gear into and out of mesh with the gears of said assembly, said camming cutout turning said lever through angles which displace said first gear from said assembly through radial distances substantially equal to the difference between the radii of the gears of said assembly; and spring means cooperating with said bail for maintaining said second cam follower in engagement with said second cam and for maintaining said first gear in mesh with a selected one of the gears of said assembly.

5. A transmission as recited in claim 4 and wherein the steps of said stepped camming cutout progress oppositely to the progression of the gears of said assembly.

6. A transmission as recited in claim 4 and wherein the obtuse angle of said second pair of opposed edges of each stepped cutout portion of said camming cutout is located beyond the angle of friction between said cam follower and said camming cutout.

7. A transmission as recited in claim 6 and wherein said first-mentioned cam follower has a pair of opposed faces which are parallel to each other and parallel to said second pair of edges of each cutout portion of said camming cutout.

8. A transmission as recited in claim 4 and wherein said first-mentioned cam follower is adjustably connected to said lever for regulating the angle of the latter with respect to said camming cutout so as to control the extent to which said first gear meshes with the gears of said assembly.

9. A transmission as recited in claim 4 and wherein said second cam has a single peripheral indentation receiving said second cam follower when said first gear is in mesh with any one of the gears of said gear assembly.

References Cited in the file of this patent

UNITED STATES PATENTS 2,662,417    Mascherpa             Dec. 15, 1953

FOREIGN PATENTS 486,048    Italy                  Feb. 12, 1952